(12) United States Patent
Bettis et al.

(10) Patent No.: US 7,970,106 B2
(45) Date of Patent: Jun. 28, 2011

(54) EMPLOYING VXML TO PROVIDE ENHANCED VOICEMAIL SYSTEM

(75) Inventors: Sonny R. Bettis, Lawrenceville, GA (US); Jon S. Plotky, Lawrenceville, GA (US); Ian M. Moraes, Suwanee, GA (US); Philip L. Lowman, Ellijay, GA (US); James H. Spencer, Tucker, GA (US)

(73) Assignee: Movius Interactive Corporation, Johns Creek, GA (US)

( * ) Notice: Subject to any disclaimer, the term of this patent is extended or adjusted under 35 U.S.C. 154(b) by 1197 days.

(21) Appl. No.: 11/623,718

(22) Filed: Jan. 16, 2007

(65) Prior Publication Data
US 2007/0127637 A1 Jun. 7, 2007

Related U.S. Application Data

(63) Continuation of application No. 11/170,531, filed on Jun. 29, 2005, now Pat. No. 7,180,986.

(60) Provisional application No. 60/584,444, filed on Jun. 30, 2004.

(51) Int. Cl.
*H04M 1/24* (2006.01)
(52) U.S. Cl. ............... 379/32.01; 379/88.17; 379/133
(58) Field of Classification Search ............... 379/67.1, 379/68, 88.17, 88.16, 88.22, 32.01, 133; 709/206; 370/352
See application file for complete search history.

(56) References Cited

U.S. PATENT DOCUMENTS

| 7,149,287 | B1 * | 12/2006 | Burger et al. | 379/88.17 |
| 7,336,771 | B2 * | 2/2008 | Crockett et al. | 379/88.03 |
| 2003/0051037 | A1 | 3/2003 | Sundaram | |
| 2004/0077332 | A1 | 4/2004 | Ephraim | |
| 2004/0086095 | A1 | 5/2004 | Dixit et al. | |
| 2004/0111269 | A1 | 6/2004 | Koch | |
| 2004/0225499 | A1 * | 11/2004 | Wang et al. | 704/257 |

FOREIGN PATENT DOCUMENTS
WO WO01/52509 A2 7/2001

* cited by examiner

*Primary Examiner* — Olisa Anwah
(74) *Attorney, Agent, or Firm* — Smith Risley Tempel Santos LLC; Gregory Scott Smith; Matthew T. Hoots

(57) ABSTRACT

An enhanced Voice eXtensible Markup Language (VXML) based voicemail system that has a distributed architecture and methods for implementing enhanced VXML based voicemail systems are disclosed. The voicemail system includes a media server, which is in communication with a telephone network. The media server is adapted to invoke a voicemail service of the distributed voicemail system and adapted to render at least a first portion of a Voice eXtensible Markup Language (VXML) page. An application server, which is in communication with the media server, is adapted to generate a VXML page and provide the VXML page to the media server. The XVML page has a tag embedded therein, and the media server processes the tag. A voicemail-account monitorer, which monitors at least a portion of the voicemail system, is invoked by the media server processing the tag.

20 Claims, 3 Drawing Sheets

EMPLOYING VXML TO PROVIDE ENHANCED VOICEMAIL SYSTEM

CROSS-REFERENCE TO RELATED APPLICATION

This application is a continuation of U.S. patent application Ser. No. 11/170,531 filed on Jun. 29, 2005 and issued as U.S. Pat. No. 7,180,986 on Feb. 20, 2007, which claims priority to United States Provisional Application for Patent entitled, "VXML Based Telephone Service System," having ser. No. 60/584,444, filed Jun. 30, 2004, which is entirely incorporated herein by reference.

This application is related to copending U.S. utility patent application entitled "Distributed IP Architecture For Telecommunications System," filed on Mar. 15, 2005, Ser. No. 11/080,744, which is entirely incorporated herein by reference.

TECHNICAL FIELD

The present invention relates to telecommunications systems and, more particularly, to an enhanced VXML based telecommunications service provision system that provides services such as voicemail.

BACKGROUND OF THE INVENTION

Over the past several decades, the telecommunications industry has continued to expand and experience growth spurts in technology. One of the most prevalent services provided in recent telecommunications technology is voicemail. Voicemail has continued to expand and establish itself as a key element in the successful operations of most businesses. The typical voicemail system today can take on a variety of forms, including a computer card that can operate within a personal computer connected to a businesses telephone system, or a computer card or component that is directly integrated into the businesses telephone system, or as a service provided by a telecommunications company.

Most voicemail systems today are very complex and typically are heavily reliant on software programming. The systems include many thousands of lines of code that typically execute on a single platform or computing device. The voicemail products are usually developed as the result of a great amount of effort by a highly skilled team of software programmers and hardware developers and typically, a single roll-out of a voicemail product requires many man-hours of development, testing, debugging and perfecting.

However in today's diverse society with ever expanding needs and nuances, it is difficult to develop a single business model that meets the needs of all prospective customers. Some customers may want a basic package of services from their voicemail system, and other customers may want a premium package of service from their voicemail system. Thus, developers are forced to develop products directed towards large business sectors, or attempt to deeply penetrate niche markets. Sometimes developers will launch multiple versions of a product in an attempt to capture a larger market share. This raises additional problems for the developers— mainly in the area of support. The more product variants that are sold, the more complex the companies support infrastructure must be to meet the needs of its customers.

Thus, there exists a need in the art for a telecommunications service platform that allows for monitoring a voicemail system for, among other things, billing purposes and system purposes. Furthermore, modern telephone networks and modern voicemail systems are quite complex. Thus, there exists a need to monitor the voicemail system for, among other things, alarms that might signify a system failure. The present invention provides such a solution.

SUMMARY OF THE INVENTION

The present invention includes a distributed voicemail system that employs Voice eXtensible Markup Language (VXML) pages. One aspect of the present invention is a VXML enhancement that creates extensions to the feature base of the VXML standard. The VXML enhancement provides for capabilities such as creating billing records, sending alarms or gathering and reporting statistics. This aspect of the present invention involves a call tag that can be used in the provision of such services. This invention can be used to track which features are most commonly used, number of calls to the voicemail system, or the like.

Briefly described, in architecture, one embodiment of the distributed voicemail system, among others, can be implemented as follows. A media server, which is in communication with a telephone network, is adapted to invoke a voicemail service of the distributed voicemail system and adapted to render at least a first portion of a Voice eXtensible Markup Language (VXML) page. An application server, which is in communication with the media server, is adapted to generate a VXML page and provide the VXML page to the media server. The XVML page has a tag embedded therein, and the media server processes the tag. A voicemail-account monitorer, which monitors at least a portion of the voicemail system, is invoked by the media server processing the tag.

Embodiment of the present invention can also be viewed as providing methods for providing voicemail service. In this regard, one embodiment of such a method, among others, can be broadly summarized by the following steps: receiving a telephone call from a caller, wherein the telephone call is received at a media server and is from a telephone network; receiving a request from the media server for a voicemail service, wherein the request is received at an application server; and generating a Voice eXtensible Markup Language (VXML) page, wherein the VXML page is generated at the application in response to receiving the request and wherein a portion of the VXML page includes a tag that is embedded therein; processing at least the portion of the VXML page having the embedded tag; and responsive to processing the portion of the VXML page having the tag embedded therein, monitoring at least a portion of the distributed voicemail system.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION OF THE INVENTION

The present invention provides a distributed IP architecture, also described as a next-generation communications platform, for telecommunications equipment, such as a PBX, voicemail system, or the like. By utilizing the architecture of the present invention, the various functionalities of the telecommunications equipment can be divided amongst various physical components and the physical components can be geographically dispersed. Each of the components communicates with each other, as needed, through independent interfaces to an IP network. The complexities of interfacing to the telephone network are handled through a single gateway component and a simplified protocol is used for communication between the remaining components of the telecommunications equipment or to the telephone network through the gateway component.

It should be understood that the distribution of functionality illustrated in the figures and described, although having novel aspects in itself, is not the only acceptable arrangement, and aspects of the present invention could be incorporated into a system that includes fewer or more components and a different arrangement of functionality among the components.

Now turning to the drawings, in which like labels refer to like elements throughout the several views, various aspects and features of the present invention are described.

Figure 1:
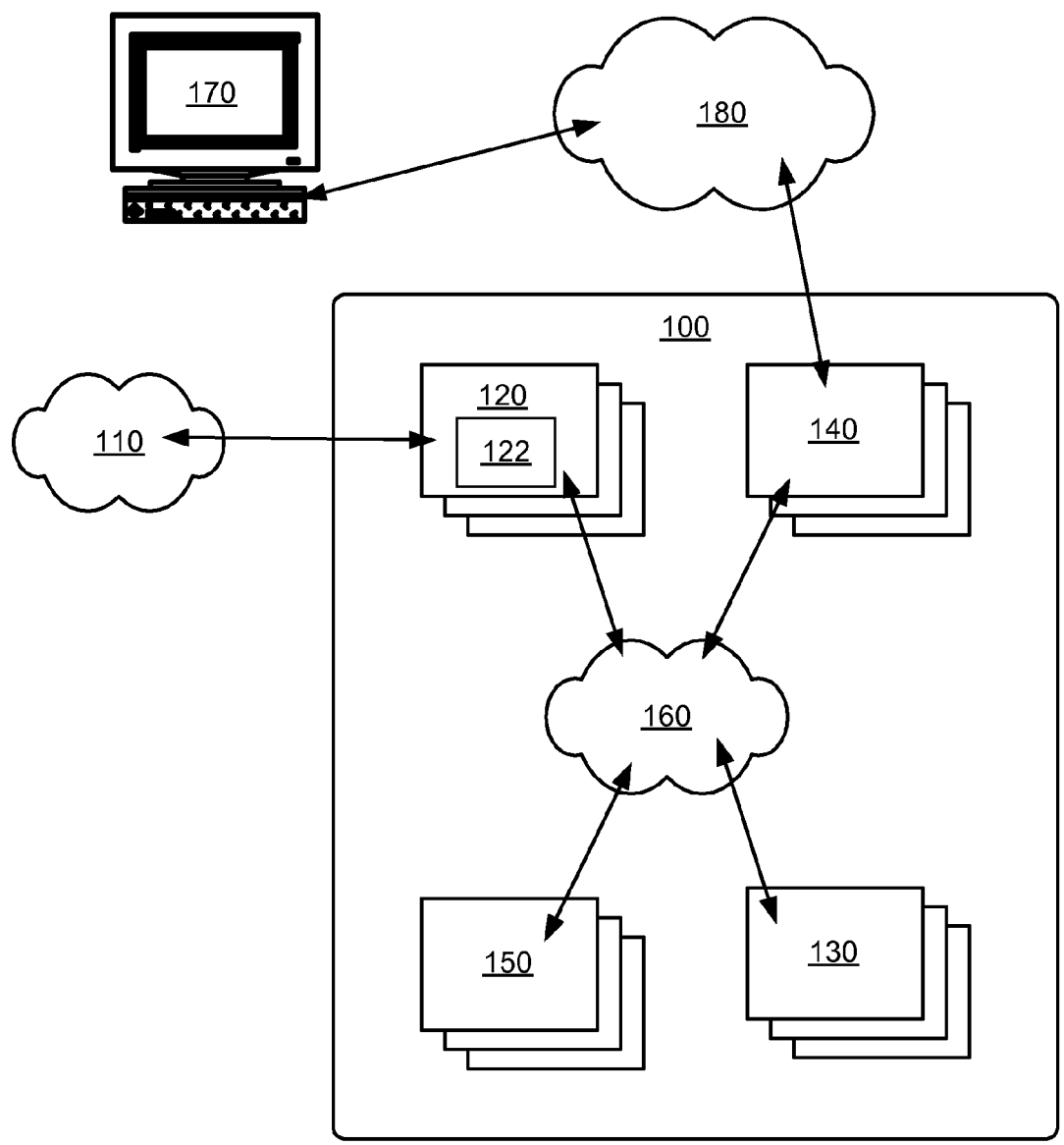
FIG. 1 is a block diagram illustrating an exemplary embodiment of a distributed voice messaging system in communication with a telephone network.

FIG. 1 is a system diagram illustrating the components and the connectivity of an exemplary next-generation communications platform 100. One aspect of the present invention is a distributed IP-based architecture for telecommunications equipment that, among other things, can provide telecommunication services such as voicemail, call forwarding and other telecommunication features. In the illustrated embodiment, the next-generation communications platform 100 has a distributed IP architecture and is connected to a telephone network 110. The telephone network 110 can be, among others, a wireless telephone network or a Public Switched Telephone Network (PSTN). The communications platform 100 is illustrated as including one or more media servers (MS) 120, one or more system management units (SMU) 130, one or more application servers (AS) 140 and one or more central data and message store (CDMS) 150, which are connected by a network 160. Typically, the network 160 is an Internet Protocol (IP) network such that communications over the IP network conform to an internet protocol (IP), which are well known in the art.

In some embodiments, a subscriber of the communications platform 100 can access the communications platform 100 via a computer 170, which is in communication with the application server 140 via a network 180, which typically is the internet The application server 140 provides web pages to the computer 170, which are typically displayed to the subscriber using a browser (not shown). The application server can provide web pages having account information that the subscriber can review. Typically, the subscriber of the communications platform 100 has a voicemail account with the communications platform, and in some embodiments, the subscriber can customize his or her voicemail account by providing information, or subscriber-customizers, to the application server 140. Typically, the subscriber can provide information to the application server 140 by entering information into fields of a web page provided by the application server 140 or by selecting options.

Briefly described, the media servers 120 terminate IP from components of the communications platform 100 and/or terminate circuit switched traffic from the telephone network 110. The media servers 120 are also responsible for trunking and call control.

Among other things, the application server 140 generates dynamic VoiceXML (VXML) pages for various applications. The application servers 140 provide the VXML pages to the media servers 120, which render the VXML pages or portions of the VXML pages. The applications servers 140 also provide an external interface to the communications platform 100 through web pages provided to subscriber computers 170.

The SMU 130 is a management portal that enables service providers to provision and maintain subscriber accounts and manage network elements from a centralized web interface.

The CDMS 150 stores voice messages, subscriber records, and manages specific application functions including notification. In some embodiments, the CDMS 150 stores subscriber customizers and subscriber attributes, both which are described in detail hereinbelow.

Each of the components in the next-generation communications platform 100 is independently scalable and independently interconnected onto the network 160. Thus, the components can be geographically distributed but still operate as a single communications platform as long as they can communicate with each other over the network 160. This is a significant advantage of the present invention that is not available in state-of-the-art communication systems. Selected components of the communication platform 100 are described in greater detail hereinbelow.

Media Server (MS)

The MS 120 terminates circuit-switched traffic from the telephone network 110. The MS 120 is responsible for call set up and control within the platform architecture. The MS 120 processes input from the user in either voice, DTMF format or other signaling scheme (much like a web client gathers keyboard and mouse click input from a user). The MS 120 presents content to the user in voice form (similar in principle to graphic and text displayed back to the user on a PC client). This client/server methodology enables rapid creation of new applications and quick utilization of content available on the World Wide Web.

The MS 120 processes incoming calls via requests to the AS 140. The requests to the application server are typically done by sending a Uniform Resource Locator (URL) or other internet standard to the application server 140. Among other information provided to the AS 140, the MS 120 normally includes the telephone number of the incoming call, i.e., the telephone number dialed by the caller of the incoming call.

A load balancer (not shown) preferably directs traffic arriving at the MS 120 to one of the plurality of ASs 140. This functionality ensures that traffic is allocated evenly between active servers. The MS 120 works as the VoiceXML client on behalf of the end-user in much the same manner as a client like Netscape works on behalf of an HTML user on a PC. The media servers include a VoiceXML browser 122 that renders VoiceXML pages for presentation to users.

VoiceXML is a standards-based scripting language for developing voice-enabled software applications. This means that developers use and leverage Web-based (HTML) development expertise in developing speech-based telephony applications.

In addition, in a preferable embodiment, the media server 120 is constructed of commercial-off-the-shelf (COTS) hardware and software components and is a carrier-grade server. Telephony interface and resource boards for telephony-specific applications can also be added. For instance, a facsimile card or software can be added to the media server 120 to manage facsimile termination.

Application Server (AS)

The modular design of the next-generation communications platform has the added advantage that it is easy to deploy enhanced services, such as voice dialing and voice navigation, unified communications solutions, multimedia messaging services, and presence & availability management applications. Adding applications to the platform is accomplished via the addition of standard application servers 140 to the common platform Each application server 140 generates application documents such as, but not limited to, VoiceXML pages and HTML pages. Typically, the VXML pages are generated in response to requests from the media server 120, and the HTML pages are generated in response to requests from the subscriber computer 170. The application server 140 leverages a web application infrastructure to interface with back-end data stores such as CDMS 150 to generate the VXML pages.

The overall web application infrastructure separates the core service logic (i.e., providing the business logic) from the presentation details (VXML) to provide a more extensible application architecture. In one embodiment, the application server 140 utilizes Java 2 Enterprise Edition (J2EE) environment and Java Server Pages (JSP) to create the dynamic VXML pages for the media server. Combining these technologies enables rapid incorporation of Speech Application Language Tags (SALT) to provide interoperability (multimodal) between applications like WAP, HTML, XHTML and voice—allowing the end user to simultaneously input data via voice command and receive presentation via WAP or HTML.

To create an environment for easy application development, the application server 140 preferably supports Template+ JSPs. Applications are implemented in JSPs using an API for access to messaging functions. These JSPs are readily modifiable making changes in application behavior and creation of new applications very easy.

The cooperation of the media server 120 and the application server 140 allows for customization of features, voicemail functions, user-interface, offered to subscribers. In one embodiment, application server 140 retrieves subscriber-customizers from the CDMS 150 and uses the subscriber-customizers when generating VXML pages. The VXML pages generated using subscriber-customizer correspond to the subscriber specified custom features, voicemail functions, and user-interface. For example, a subscriber might want to customize his voicemail account by changing the order of menu items offered to a caller or by changing the voicemail functions invoked by the selection of an option, etc.

Common Database and Message Store (CDMS)

Figure 2:
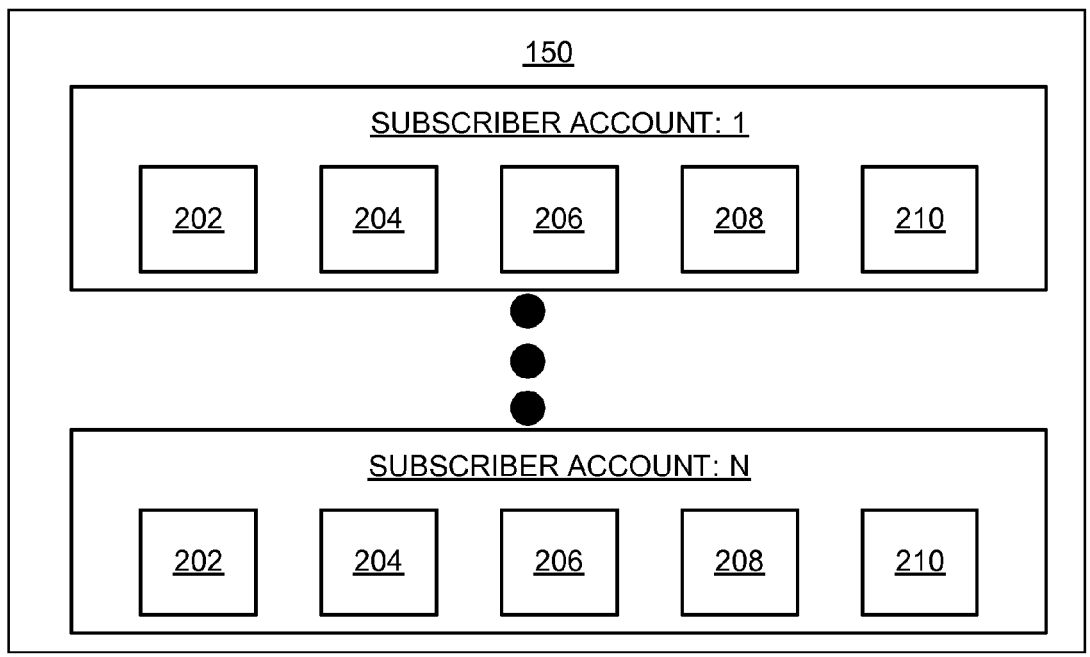
FIG. 2 is block diagram of content stored in a central data and message store.

Referring to FIG. 2, the CDMS 150 has sufficient storage capacity such that the communications platform 100 can provide services to multiple subscribers. Stored in the CDMS 150, among other things, are voice/audio messages 202, subscriber records 204, subscriber account information 206, account attributes 208, and subscriber-customizers 210. In some embodiments, each subscriber has their own account attributes 208, and in other embodiments, account attributes can be shared with multiple subscribers.

The CDMS 150 is preferably designed with fully redundant components and utilizes reflective memory and Redundant Array of Independent Disks (RAID) technology for fault tolerance, immediate fail over and recovery. This ensures five 9's availability for associated hardware and software components. Essential disk drive and RAID controller components are preferably "hot swappable" eliminating the need to power down the system for replacements. With the CDMS 150, performance is optimized for the unique characteristics of voice messaging, eliminating the performance degrading, unnecessary e-mail-centric database functionality that comes with the searching and sorting of e-mail stores.

The CDMS 150 can utilize standard of the shelf e-mail storage systems. The message store is abstracted through the use of Java middleware that allows the selection of the message store to be transparent to the application, enabling each message type to be stored in the most efficient store possible.

Voice/audio messages 202 are stored on the CDMS 150 when a caller leaves a voicemail message for a subscriber. Voice/audio messages 202 also include voice/audio messages transferred and or forwarded between subscribers. Voice/audio messages 202 can also include the subscriber's "greeting," which can be played to a caller.

Records for each subscriber are stored in subscriber records 204 for that subscriber. Information included in subscriber records includes, but is not limited to, the number of calls and/or faxes for a give time period, number of saved messages, number of recorded messages, number of non-retrieved messages.

Subscriber account information 206 includes subscriber name, telephone number for the account, distribution lists, forwarding telephone number(s), and billing information.

Account attributes 208 include attributes that can be used to augment, modify or control the content of the VXML page rendered by to the media server 120 or the manner in which the VXML page is rendered. Non-limiting examples of account attributes 208 include a language indicator, which can specify a language used in VXML pages generated by the application server 140, temporal indicators, calling number trigger, area code trigger. A temporal indicator can be used to modify a subscriber's voicemail account based upon the time-of-day, day of week, etc. An area code trigger can be used to modify a subscriber's voicemail account based on the area code of the calling number. The calling number trigger can be used to modify the subscriber's account based upon the calling number. In some embodiments, the attributes can be supplied by the subscriber using computer 170, and in some embodiments, the subscriber can specify how the subscriber's voicemail account is modified by the attributes. It should be remembered that the account attributes described hereinabove are non-limiting examples and other attributes can also be used.

Subscriber-customizers 210 can be provided by the subscriber using computer 170. The subscriber can provide the subscriber-customizers to provide customized VXML pages. Typically, a subscriber provides subscriber-customizers 210 by accessing the communications platform 100 using computer 170. The application server 140 provides the subscriber with web pages, which are displayed in a window of a browser on the computer 170. The subscriber can then select customizable options. For instance, for each menu presentation in a VXML page, the subscriber-customizers can be used to define the order in which the options are presented, the key presses associated with selecting the options, and the voicemail functions such as, but not limited to, transferring calls, forwarding messages, deleting messages stored in the CDMS 150, deleting messages stored in the CDMS 150, changing the subscriber's greeting, etc.

System Management Unit (SMU)

The SMU 130 provides a centralized point for service providers to manage all network elements, providing remote access, maintenance, and backup functionality. The SMU 130 provides a single interface for provisioning, alarming, reports, and subscriber migration. The SMU 130 integrates and customizes systems with new elements and applications, and provides operational support and network management functions for carriers experiencing swiftly growing networks and exploding traffic volumes.

Voicemail Operation

Figure 3:
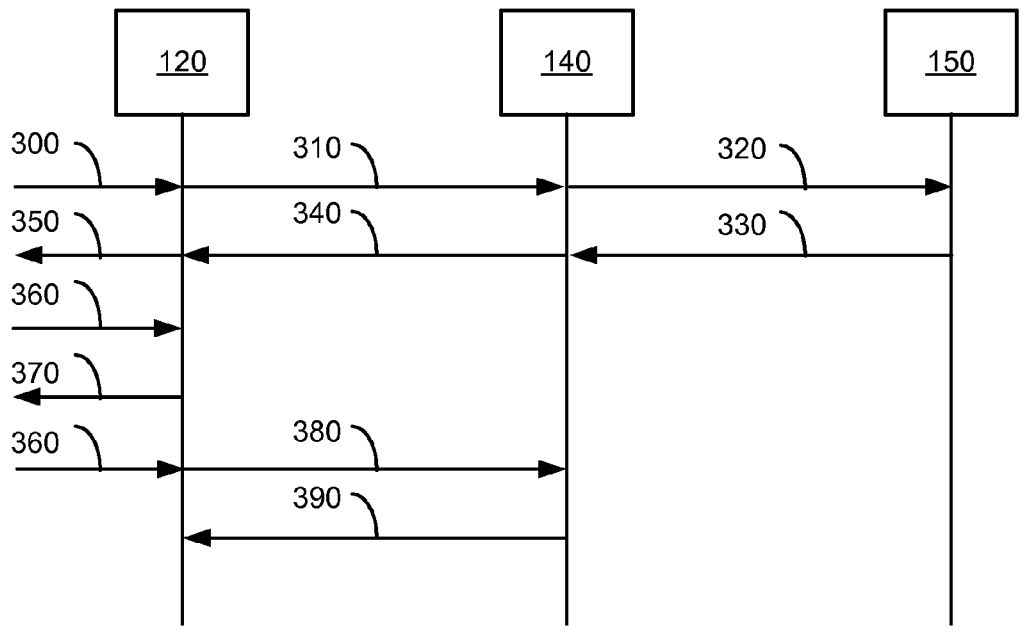
FIG. 3 is an exemplary flow diagram for performing voicemail.

Referring to FIG. 3, initially a service request 300 is received at the media server 120. The service request may take on a variety of forms and may represent a variety of services such as, but not limited to, an inbound call voice call, a call transfer, an inbound facsimile, an inbound text message, or a variety of inbound or outbound services typical to a telephonic or voicemail system. In the illustrated example, the service request 300 is the reception of an inbound call to a subscriber's number. The media server 120 can use functions such as, but not limited to, Automatic Number Identification (ANI) and Dialed Number Identification Number Service (DNIS) to gather information such as, but not limited to, the calling number and the called number. In addition, the media server 120 can also gather other information such as Trunk Group.

The media server 120 responds to the inbound call by invoking a service of the communications platform 100. The media server invokes the service by sending an invoke-service message 310 to the application server 140. Typically the invoke-service message 310 conforms to an internet protocol. The invoke-service message 310 typically includes information such as the called number. The invoke-service message 310 can also include a service tag or other identifier that the application server 140 uses to determine which type of service the media server is invoking. For example, in some embodiments, the media servers 120 is adapted to determine whether the incoming call is a voice-call or a facsimile transmission and responsive to determining the type of incoming call, the media server 120 includes the appropriate service tag in the invoke-service message 310.

Depending on the service request, the operation of invoking the service may vary greatly. In the instant example, the media server 120 may include the number that was called when invoking the service. In an exemplary embodiment, the media server 120 invokes the request by sending a URL to the application server 140. This is similar to the operation of a typical web oriented browser when requesting the loading of an HTML type page. In this case, the media server 120 is invoking a particular VXML page from the application server 140. The process of sending the URL to the application server 140 basically instructs the application server 140 to provide a VXML page to the media server 120. In some embodiments, the URL instructs the application to provide a default VXML page.

The application server 140 may use information in the invoke-service message 310 to look up subscriber information stored in the CDMS 150. The application server 140 sends an application server query 320 to the CDMS 150. Typically, the application server query 320 includes information carried by the invoke-service message 310. For instance, the application server 150 may use the called number to get subscriber information associated with the subscriber to whom the called number is assigned.

The CDMS 150 sends a response 330 to the application server 140. The response 330 may include some or all of the account attributes 208 associated with the called number and/or some or all of the subscriber-customizers 210 associated with the called number.

The application server 140 uses some or all of the account attributes 208 and/or subscriber-customizers 210 when the application server generates VXML pages. Typically, the application server 140 may use some account attributes 208 (and/or subscriber-customizers 210) in some VXML pages and other account attributes 208 (and/or subscriber-customizers 210) in other VXML pages.

Thus, the application server 140 builds a VXML page 340 based on the information provided from the CDMS 150. In performing this function, the application server 140 puts in user specific or other specific data into the VXML page 340 and passes the VXML page 340 to the media server 120.

In some situations, the media server 120 renders the entire VXML page 340 to the caller and in other situations the media server renders at least one portion of the VXML page 340. In the embodiment illustrated, the media server 120 renders a portion 350 of the VXML page 340. The rendered portion 350 is provided to the caller.

Once the rendered portion 350 is provided to the caller, the caller may provide further input 360 to the media server 120, and the media server 120 might respond to the input 360 in different ways. For example, the media server 120 might respond to the input 360 by providing the same portion 350 of the VXML page 340 or by rendering a different portion of the VXML page 340. For instance, the VXML page 340 may be a menu selection. When the caller makes a selection (provides input 360) by pressing a button or making an audible statement, this may result in the media server 120 moving to a particular form (or portion) on the VXML page 340. The media server 120 will then render the particular form and provide the rendered portion 370 to the caller. Alternatively, if the input 360 did not correspond to one of the menu items, the media server 120 will re-provide the rendered portion 350.

In some situations, the input 360 might cause the media server 120 to send a request 380 to the application server 140. The request might be for a new service of the communication platform 100 or might be for another VXML page. The media server 140 responds to the request 380 by sending another VXML page 390, which might be related to another service of the communications platform 100 or another page related to voicemail service, to the media server 120.

For example, assume that the caller is the subscriber of the communication platform for the called number and that the first VXML page 340 is related to the invocation of the voicemail service for the caller. In that case, assuming the input 350 is an option for retrieving messages stored in the CDMS 150, then the second VXML page 390 might carry information related to messages stored in the CDMS 150.

Thus, advantageously, simplex forms or actions can be handled by the media server jumping to various locations in a loaded VXML page while complicated functions may be met by requesting additional pages from the application server.

In addition, the VXML system of the present invention advantageously allows for the system to operate in a vast number of different manners to appear as though it is a custom system for each user or caller, when in fact the system does not have to be modified at all but rather, just simply control attributes associated with particular trigger mechanisms (such as area code, caller ID, ANI, time of day, etc,) can be programmed and then used to augment the system.

Voicemail Monitor

Figure 4:
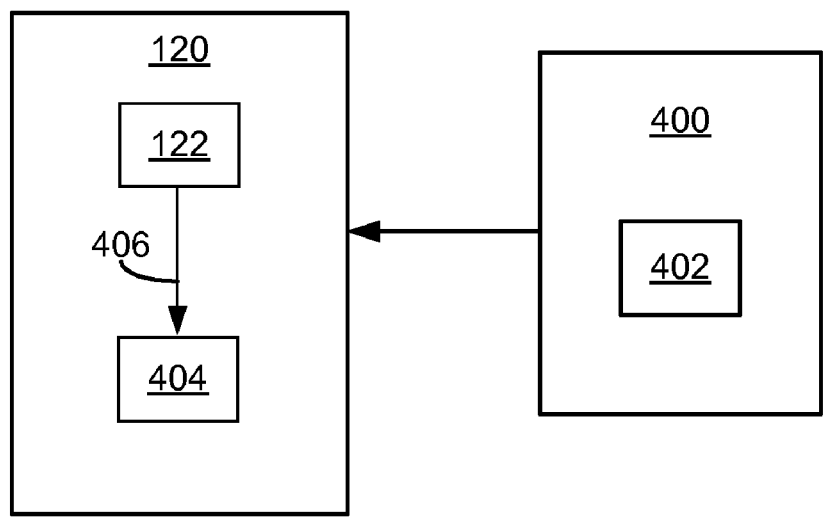
FIG. 4 is a block diagram of a media server having a voicemail-account monitorer.

Referring to FIG. 4, in some embodiments, a VXML page 400 includes a tag 402, which is embedded into the VXML page 400 by the application server 140. The tag 402 is typically an object tag or JSP tag or other tag known to those skilled in the art. It should be noted that in one embodiment, the tag 402 is embedded into the XVML page 400 in response to media server 120 requesting the VXML page 400. In other embodiments, the application server 120 can be instructed to include the tag 402 into the VXML page 400. In some situations, the SMU 130 might instruct the application server 140 to embed one or more tags in the VXML page 400, and in other situations, the SMU 130 might instruct the application server 140 not to embed tags in the VXML page 400. Thus, in some embodiments, the embedding of tags in the VXML page 400 can be turned on or off.

The media server 120 receives the VXML page 400 from the application server 140 and provides the VXML page 400 to the browser 122. The browser 122 processes and/or renders the VXML page 400. The browser 122 processes the tag 402 during the processing and/or rendering of the VXML page 400, and in response to processing the tag 402, the browser 122 initiates a voicemail-account monitorer 404. Typically, the voicemail-account monitorer 404 is run within the browser 122. However, in some embodiments, the voicemail-account monitorer 404 is run outside of the browser 122. In that case, the browser 122 sends a trigger 406, which causes the voicemail-account monitorer 404 to be initiated. For example, in one embodiment, the media server 120 receives the trigger 406 from the browser 122, and the media server 120 initiates the voicemail-account monitorer 404. However, in some embodiments, the voicemail-account monitorer 404 is run on a component, different from the media server 120, such as the application server 140 or the system management unit 130, and in that case, the component receives the trigger 406, via the network 160, and initiates the voicemail-account monitorer 404. Furthermore, in some embodiments, the voicemail-account monitorer is run on multiple components of the communications platform 100. For example, the voicemail-account monitorer 404 can include submodules that are run on the media server 120, the application server 140 and the system management unit 130. Consequently, in some embodiments, the browser 120 sends a trigger (or triggers) to selected components of the communication platform 100, and the selected components then initiate their respective submodules of the voicemail-account monitorer 404. For the sake of simplicity, the voicemail-account monitorer 404 is described as running on the media server 120, but this is intended as a non-limiting example.

In some embodiments, the voicemail-account monitorer 404 includes logic for, among other things, detecting alarms. Typically, the voicemail-account monitorer 404 includes the logic for detecting alarms from the telephone network 110. Typically, the voicemail-account monitorer 404 includes logic for responding passively and pro-actively to detected alarms. Passive responses include sending alarm notifications to one or more of the components of the communications platform 100. For example, in response to detecting an alarm the voicemail-account monitorer 404 sends an alarm notification to the application server 140. Based on the type of alarm, components of the communications platform 100 might simply ignore alarm notifications or react pro-actively. Pro-active response to detected alarms by the voicemail-account monitorer include, but are not limited to, terminating the call, transferring the call, etc. For example, if the voicemail-account monitorer 404 detects an alarm, the voicemail-account monitorer 404 can respond by terminating the service associated with the incoming call that had the alarm.

In some embodiments, the voicemail-account monitorer 404 includes logic for gathering data related to requested services and/or related to the content provided to the caller. For example, in one embodiment, the voicemail-account monitorer 404 tabulates the services requested by the media server 120 and counts for each service the number of times the service is invoked by the media server 120. Of course, in some embodiments, the voicemail-account monitorer 404 can tabulate selected services of the communications platform, and count the number of times the selected services are invoked by the media server 120. In some embodiments, the voicemail-account monitorer 404 tabulates data using the URL of the VXML pages provided to the browser 122.

In another embodiment, the voicemail-account monitorer 404 counts the number of times that specific content is provided to the caller. In this case, the voicemail-account monitorer 404 counts the number of times that a "form", i.e., a portion of the VXML page 400, is provided to the caller.

In addition to tabulating content, the voicemail-account monitorer 404 can include logic for, among other things, tabulating features of the voicemail system and for counting the number of times the features are invoked. For example, the voicemail-account monitorer 404 can include logic for counting the number of times a subscriber invokes a voicemail feature such as message forwarding, which forwards a message stored in the CDMS 150 to a different subscriber of the communications platform 100.

The voicemail-account monitorer 404 is adapted to provide the SMU 130 with data that it has collected. In some embodiments, the voicemail-account monitorer 404 provides the SMU 130 with gathered data when the incoming call is terminated. In other embodiments, the voicemail-account monitorer 404 accumulates data over a period of time and provides accumulated data to the SMU 130 at predetermined times.

Report Generator

Figure 5:
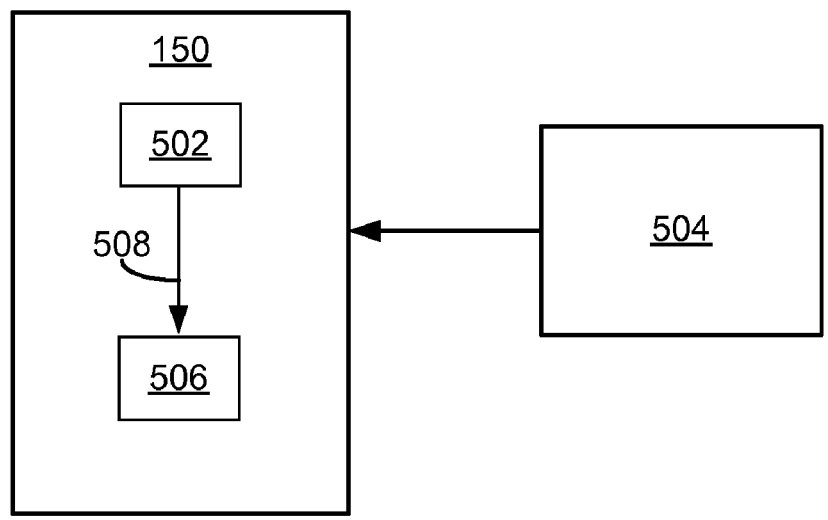
FIG. 5 is a block diagram of a system management unit having a report generator.

Referring to FIG. 5, the system management unit 150 includes a report generator 502. The report generator 502 receives data 504 from the voicemail-account monitorer 404. The report generator 502 includes logic for, among other things, statistical analysis of the data 504. The report generator 502 analyzes the data 504 to determine among other things, the relative frequency for which features of the communications platform are invoked, the number of calls to the communications platform 100, etc.

In some embodiments, the report generator 502 is in communication with a billing entity 506. The billing entity 506 uses reports 508 from the report generator 502 to bill subscribers of the communications platform 100 for services.

It should be emphasized that the above-described embodiments of the present invention, particularly, any "preferred" or "exemplary" embodiments, are merely possible examples of implementations, merely set forth for a clear understanding of the principles of the invention. Many variations and modifications may be made to the above-described embodiment(s) of the invention without departing substantially from the spirit and principles of the invention. It should also be appreciated that any particular embodiment may include only some of the various aspects of the present invention. All such modifications and variations are intended to be included herein within the scope of this disclosure and the present invention and protected by the following claims.

What is claimed is:

1. A distributed voicemail system comprising:
a media server in communication with a telephone network, the media server adapted to invoke a voicemail service of the distributed voicemail system and adapted to render at least a first portion of a Voice eXtensible Markup Language (VXML) page;
an application server in communication with the media server, the application server adapted to generate a VXML page responsive to a request from the media server and provide the VXML page to the media server, wherein a portion of the VXML page includes a tag that is embedded therein;

a browser in communication with the media server and operable to render the at least a first portion of the VXML page and in response to detecting the embedded tag, monitoring at least a portion of the voicemail system.

2. The distributed voicemail system of claim 1, wherein the browser gathers information related to usage of the distributed voicemail system by the caller.

3. The distributed voicemail system of claim 2, wherein the browser gathers information by enumerating the number of times that at least a given portion of the VXML page is rendered.

4. The distributed voicemail system of claim 2, wherein the application server generates at least a second VXML page and provides the media server with the second VXML page, wherein the media server renders at least a given portion of the second VXML page, and wherein the browser gathers information by enumerating the number of times that at least the given portion of the second VXML is rendered.

5. The distributed voicemail system of claim 2, wherein the application server is adapted to generate and provide the media server with multiple VXML pages, and wherein the browser gathers information by enumerating the number of times that at least a portion of the multiple VXML pages is rendered.

6. The distributed voicemail system of claim 5, further including:
a system management unit in communication with the media server, the system management unit adapted to use the enumerated number of times that at least a portion of the multiple VXML pages is rendered to create a voicemail system usage report.

7. The distributed voicemail system of claim 2, further including a system management unit that is in communication with the media server, the system management unit is adapted to create billing records using the gathered information.

8. The distributed voicemail system of claim 1, wherein the voicemail monitoring system is adapted to detect an alarm and send an alarm notification.

9. The distributed voicemail system of claim 1, wherein the tag is an external VXML tag.

10. The distributed voicemail system of claim 1, wherein the tag is a Java Server Page (JSP) VXML tag.

11. A method, operating within a distributed voice mail system and providing voicemail service, the method comprising the steps of:
receiving a telephone call from a caller, wherein the telephone call is received at least in part, through a telephone network;
during the telephone call, receiving a request for a voicemail service;
responsive to receiving the request, generating a Voice eXtensible Markup Language (VXML) page, wherein a portion of the VXML page includes a tag that is embedded within the VXML page;
processing at least the portion of the VXML page including the embedded tag;
responsive to processing the embedded tag embedded monitoring at least a portion of the operation of the distributed voicemail system.

12. The method of claim 11, wherein the step of monitoring includes gathering information related to usage of the distributed voicemail system by the caller.

13. The method of claim 12, wherein the step of gathering information includes enumerating the number of times that at least a given portion of the VXML page is processed.

14. The method of claim 12, further including the steps of:
generating at least a second VXML page;
processing the second VXML page; and
enumerating the number of times that at least the given portion of the second VXML is rendered.

15. The method of claim 12, further including the steps of:
providing multiple VXML pages to a first system, wherein the multiple VXML pages are generated at a second system; and
enumerating the number of times that at least a portion of the multiple VXML pages are rendered.

16. The method of claim 15, further including the step of using the enumerated number of times that at least a portion of the multiple VXML pages are rendered to create a voicemail system usage report.

17. The method of claim 12, further including the step of creating billing records using the gathered information.

18. The method of claim 11, further including the steps of:
detecting, at the first system, an alarm; and
sending, from the first system, an alarm notification.

19. The method of claim 11, wherein the tag is an external VXML tag.

20. The method of claim 11, wherein the tag is a Java Server Page (JSP) VXML tag.

* * * * *